(12) United States Patent
Fukawatase et al.

(10) Patent No.: US 8,899,617 B2
(45) Date of Patent: Dec. 2, 2014

(54) CURTAIN AIRBAG DEVICE AND OCCUPANT PROTECTING DEVICE

(71) Applicant: Toyota Jidosha Kabushiki Kaisha, Toyota-shi, Aichi-ken (JP)

(72) Inventors: Osamu Fukawatase, Miyoshi (JP); Hiroyuki Taguchi, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/088,691

(22) Filed: Nov. 25, 2013

(65) Prior Publication Data

US 2014/0217709 A1    Aug. 7, 2014

(30) Foreign Application Priority Data

Feb. 5, 2013    (JP) .................................. 2013-020594

(51) Int. Cl.
     *B60R 21/16*      (2006.01)

(52) U.S. Cl.
     USPC ........................................................ 280/730.2

(58) Field of Classification Search
     USPC ................................. 280/730.2, 743.1, 743.2
     See application file for complete search history.

(56) References Cited

U.S. PATENT DOCUMENTS

| | | | |
|---|---|---|---|
| 6,338,498 B1 * | 1/2002 | Niederman et al. | 280/728.2 |
| 7,690,684 B2 * | 4/2010 | Tobaru et al. | 280/756 |
| 7,967,332 B2 * | 6/2011 | Karlsson | 280/730.2 |
| 2005/0035577 A1 * | 2/2005 | Barko et al. | 280/730.2 |
| 2006/0163853 A1 * | 7/2006 | Keshavaraj | 280/743.1 |
| 2009/0102169 A1 | 4/2009 | Gloeckler et al. | |
| 2010/0100285 A1 * | 4/2010 | Tobaru | 701/45 |
| 2012/0223550 A1 * | 9/2012 | Mazanek et al. | 297/216.1 |
| 2012/0235388 A1 * | 9/2012 | Suzuki | 280/730.2 |
| 2012/0306186 A1 * | 12/2012 | Weyrich et al. | 280/743.1 |
| 2014/0042732 A1 * | 2/2014 | Taguchi et al. | 280/729 |

FOREIGN PATENT DOCUMENTS

| | | |
|---|---|---|
| JP | 2006-088919 A | 4/2006 |
| JP | 2008-006895 A | 1/2008 |
| JP | 2009-531216 A | 9/2009 |
| JP | 2012-020719 A | 2/2012 |
| JP | 2012-214114 A | 11/2012 |

* cited by examiner

*Primary Examiner* — Faye M. Fleming
(74) *Attorney, Agent, or Firm* — Gifford, Krass, Sprinkle, Anderson & Citkowski, P.C.

(57) ABSTRACT

A curtain airbag device comprising: a main deploying portion that, at a time when at least one of a small overlap impact or an oblique impact arises, receives a supply of gas and expands, and is deployed in a shape of a curtain along a side window glass; an outer side deploying portion that is formed integrally with a front end side, in a vehicle front-rear direction, of the main deploying portion, and that receives a supply of gas from the main deploying portion and is expanded and deployed; and an inner side deploying portion that is formed integrally with the front end side, in the vehicle front-rear direction, of the main deploying portion, and that receives a supply of gas from the main deploying portion and expands, and is deployed overlappingly at a vehicle width direction inner side with respect to the outer side deploying portion.

20 Claims, 4 Drawing Sheets

FIG.4

CURTAIN AIRBAG DEVICE AND OCCUPANT PROTECTING DEVICE

CROSS-REFERENCE TO RELATED APPLICATION

This application claims priority under 35 USC 119 from Japanese Patent Application No. 2013-020594, the disclosure of which is incorporated by reference herein.

BACKGROUND OF THE INVENTION

1. Field of the Invention

The present invention relates to a curtain airbag device and to an occupant protecting device that has the curtain airbag device.

2. Description of Related Art

In a curtain airbag, there is known a structure in which an end portion inflating portion, that is deployed at the front of a general inflating portion, is moved toward the vehicle inner side by a tension cloth that is deployed between the front end of the general inflating portion and the front pillar (see, for example, Japanese Patent Application Laid-Open (JP-A) No. 2008-006895). Further, a similar structure is disclosed in JP-A No. 2012-020719.

SUMMARY OF THE INVENTION

In a structure in which an end portion inflating portion is moved toward the vehicle inner side by a tension cloth, it is difficult to ensure the amount of movement of the end portion inflating portion toward the vehicle inner side. Therefore, there is room for improvement in a structure that protects an occupant by an end portion inflating portion.

An object of the present invention is to provide a curtain airbag device and an occupant protecting device that can improve the occupant protecting ability by an inner side deploying portion that is expanded and deployed at the front of a main deploying portion.

A curtain airbag device relating to a first aspect includes: a main deploying portion that, at a time when a side impact arises, and at a time when at least one of a small overlap impact or an oblique impact arises, receives a supply of gas and expands, and is deployed in a shape of a curtain along a side window glass; an outer side deploying portion that is formed integrally with a front end side, in a vehicle front-rear direction, of the main deploying portion, and that receives a supply of gas from the main deploying portion and is expanded and deployed; and an inner side deploying portion that is formed integrally with the front end side, in the vehicle front-rear direction, of the main deploying, portion, and that receives a supply of gas from the main deploying portion and expands, and is deployed overlappingly at a vehicle width direction inner side with respect to the outer side deploying portion.

DETAILED DESCRIPTION OF THE INVENTION

Figure 1:
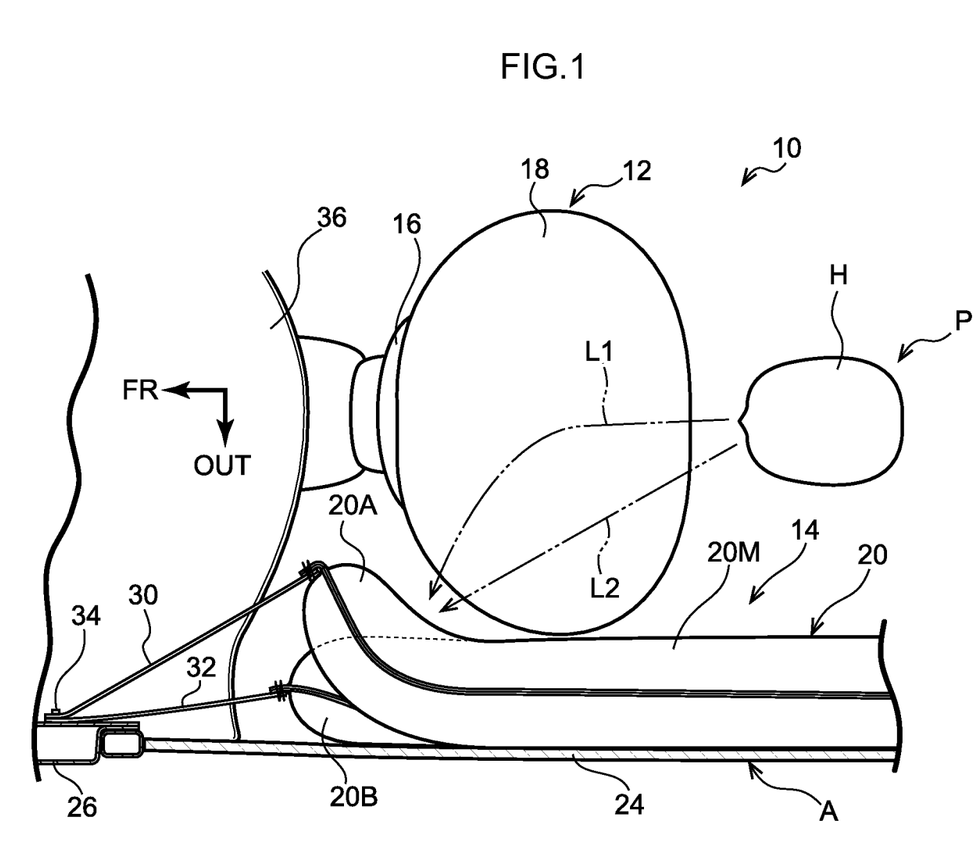
FIG. 1 is a plan view schematically showing an operated state of an occupant protecting device relating to an embodiment of the present invention.
Figure 2:
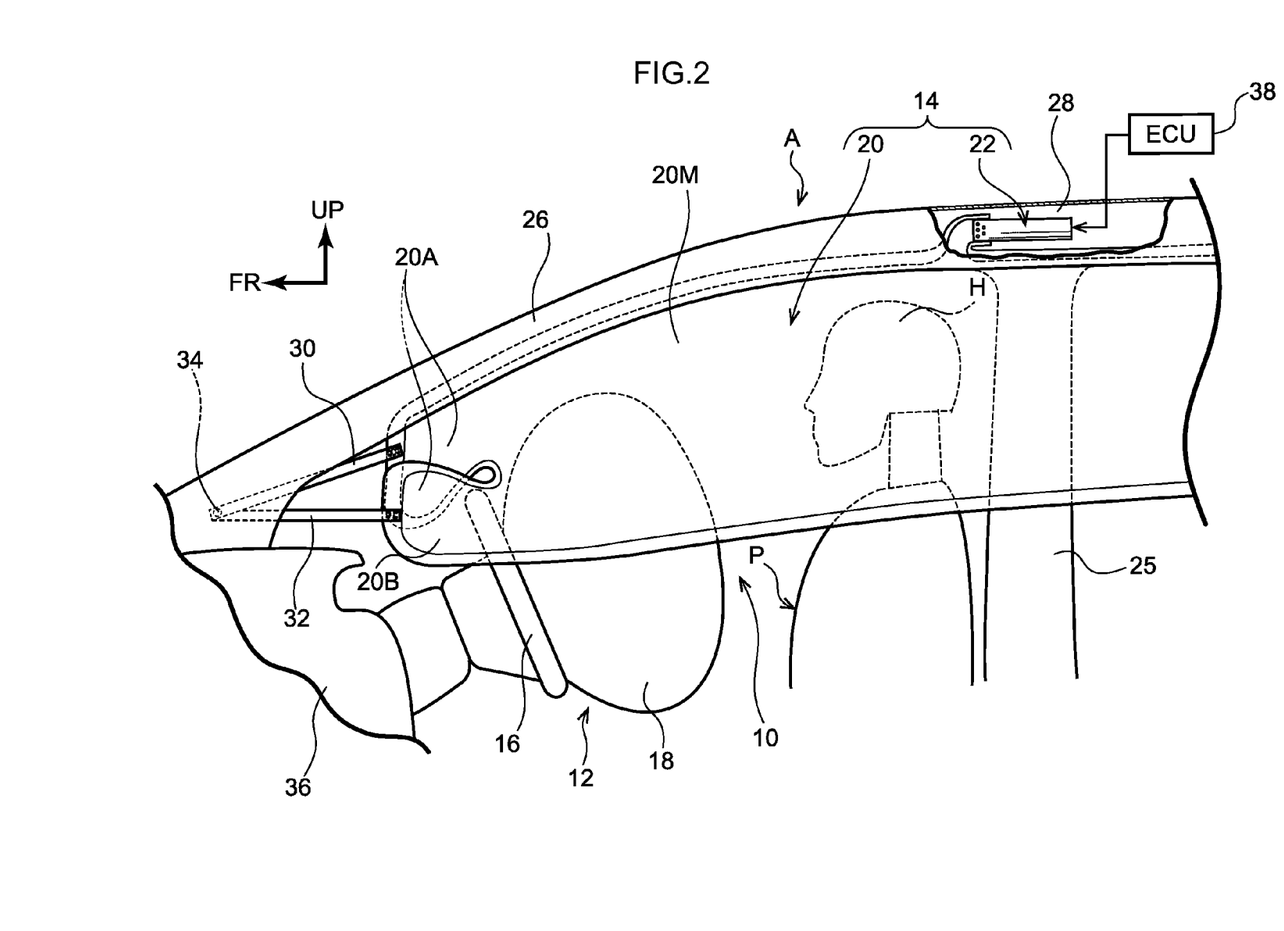
FIG. 2 is a side view that is seen from a vehicle outer side and schematically shows the operated state of the occupant protecting device relating to the embodiment of the present invention.
Figure 3A:
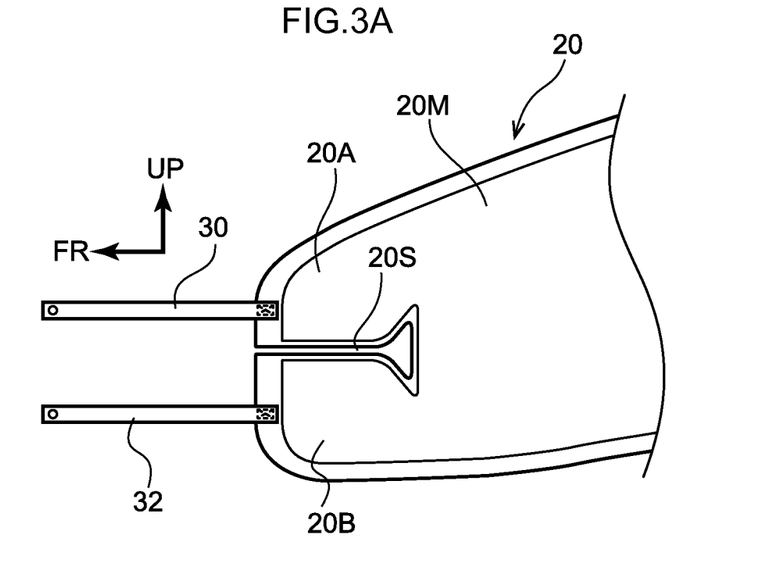
FIG. 3A is a side view showing a front portion of a curtain airbag that structures the occupant protecting device relating to the embodiment of the present invention, and showing a state of not being restrained to a vehicle body and a state of deployed and not being expanded (before being folded-up).
Figure 3B:
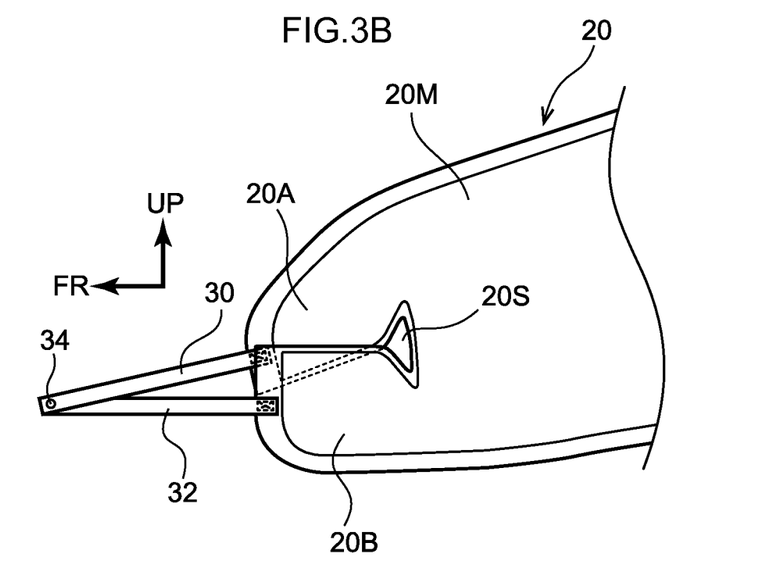
FIG. 3B is an side view showing the front portion of the curtain airbag that structures the occupant protecting device relating to the embodiment of the present invention, and showing a state of being restrained by a tether to the vehicle body and a state of deployed and not being expanded (before being folded-up).

An occupant protecting device 10 relating to an embodiment of the present invention is described on the basis of FIG. 1 through FIG. 3. Note that arrow FR, arrow UP and arrow OUT, that are shown appropriately in the respectively drawings, indicate the frontward direction, the upward direction and the vehicle width direction outer side, respectively, of an automobile A to which the occupant protecting device 10 is applied. Hereinafter, when description is given by simply using the frontward and rearward, and upward and downward, directions, they indicate frontward and rearward in the vehicle front-rear direction, and the upward and downward in the vehicle up-down direction, unless otherwise indicated.

A portion of a vehicle cabin interior of the automobile A to which the occupant protecting device 10 is applied is shown in a plan view in FIG. 1. A portion of the automobile A is shown in FIG. 2 in a side view seen from a vehicle outer side. As shown in these drawings, the occupant protecting device 10 is structured to include a driver's seat airbag device 12 serving as an airbag device for a front seat, and a curtain airbag device 14.

(Structure of Driver's Seat Airbag Device)

The driver's seat airbag device 12 has an airbag 18 for a frontal impact that is deployed at the rear of a steering wheel 16. The airbag 18 for a frontal impact is accommodated in a folded-up state within the steering wheel 16 together with an unillustrated inflator. Due to the inflator being operated, the airbag 18 for a frontal impact receives a supply of gas from the inflator, and is expanded and deployed between the steering wheel 16 and a driver's seat occupant P.

As described later, the inflator of this driver's seat airbag device 12 is operated at the time of a frontal impact of the automobile A, and at the time of a small overlap impact, and at the time of an oblique impact. Note that the states of impact of a small overlap impact and an oblique impact are described later.

(Structure of Curtain Airbag Device)

As shown in FIG. 2, the curtain airbag device 14 has a curtain airbag 20 and an inflator 22 that serves as a gas supplying device. The curtain airbag 20 is formed so as to deploy in the shape of a curtain along a side window glass 24 (see FIG. 1) that serves as a vehicle cabin inner side portion. In this embodiment, the curtain airbag 20 is structured so as to cover the front and rear side window glasses 24, that are positioned at the sides of the front seat and the rear seat, and a center pillar 25. Note that mainly the front portion of the curtain airbag 20 is illustrated in FIG. 1 and FIG. 2.

Although not illustrated, the curtain airbag 20 is accommodated in a portion that extends from a front pillar (an A pillar) 26 over a roof side portion 28 to a vicinity of a rear pillar, in a state of being, for example, folded into the form of a roll or folded into the form of bellows and made into an elongated shape. The roof side portion 28 in this embodiment forms the upper edges of front and rear door openings that serve as opening portions for ingress and egress. The door openings are formed so as to be surrounded by the roof side portion 28, the front pillar 26, the center pillar 25, and the rear pillar and a rocker that are both unillustrated.

More concretely, the curtain airbag 20 is accommodated between a roof head lining and a roof side rail that forms the roof side portion 28, and between the front pillar 26 and the pillar garnish. Note that a portion of the front end side of the curtain airbag 20 may be folded-up or folded-over toward the vehicle width direction inner side and accommodated in the roof side portion 28 or within the roof front end portion.

Further, due to the inflator 22 being operated, the curtain airbag 20 receives a supply of gas from the inflator 22, and deploys along the front and rear side window glasses 24 and the center pillar 25, and protects the heads of the occupants of the front seat and the rear seat. Concretely, a combustion type or a cold gas type inflator is employed for the inflator 22, and, by being operated, the inflator 22 supplies generated gas to the interior of the curtain airbag 20. The gas jet-out opening of the inflator 22 communicates with the inside of the curtain airbag 20. In this embodiment, the inflator 22 is disposed in the roof side portion 28. Note that the shape of the curtain airbag 20 is described later.

The above-described curtain airbag device 14 is provided at each of the roof side portions 28 and the like at the vehicle width direction both sides of the automobile A. Although illustration and detailed description are omitted, the curtain airbag device 14 for the front occupant's seat side is structured so as to have line symmetry (left-right symmetry) with the curtain airbag device 14 for the driver's seat side, across the vehicle width direction center (central line) of the automobile A. This curtain airbag 14 for the front occupant's seat side, and a front occupant's seat airbag device that serves as an airbag device for a front seat, structure an occupant protecting device.

(Structure of Curtain Airbag Front Portion)

The front portion at the curtain airbag 20 is structured to include a main deploying portion 20M that mainly protects a head H of the driver's seat occupant P with respect to side impacts and roll-overs, and a pair of auxiliary deploying portions 20A, 20B that are expanded and deployed at the front of the main deploying portion 20M. Concrete description is given hereinafter.

An deployed state, in a non-restrained state with respect to the vehicle body and a non-expanded state, of the front portion of the curtain airbag 20 is shown in a side view in FIG. 3A. As shown in this drawing, the auxiliary deploying portions 20A, 20B are made into shapes of bags that are independent of one another, and are extended forward integrally from the main deploying portion 20M so as to communicate with the main deploying portion 20M at the rear end sides thereof.

In the above-described deployed state shown in FIG. 3A, the auxiliary deploying portions 20A, 20B are separated vertically, with a slit 20S that is formed along the front-rear direction therebetween, so as to not overlap one another. These main deploying portion 20M and auxiliary deploying portions 20A, 20B are formed integrally by a common pair of base fabric being sewn-together. Gas from the inflator 22 is supplied via the main deploying portion to the auxiliary deploying portions 20A, 20B respectively.

Further, the rear end of a tether 30 is connected by sewing or the like to the front end of the auxiliary deploying portion 20A that is positioned at the upper side with respect to the slit 20S. On the other hand, the rear end of a tether 32 is connected by sewing or the like to the front end of the auxiliary deploying portion 20B that is positioned at the lower side with respect to the slit 20S. Further, as shown in FIG. 3B, due to the front ends of the tethers 30, 32 being restrained together at a restraining portion 34, the auxiliary deploying portions 20A, 20B are set in a state of overlapping one another in the thickness direction, i.e., the vehicle width direction. Note that, as shown in FIG. 2, the restraining portion 34 is connected to the front lower portion of the front pillar 26.

In this embodiment, the front end side of the auxiliary deploying portion 20A at the upper side is bent downward and is overlapped, in the thickness direction, with the auxiliary deploying portion 20B, such that the tether 32 at the lower side is deployed substantially horizontally and the front end side of the tether 30 at the upper side is deployed at an incline toward the restraining portion 34. Note that, as shown in FIG. 3A, the rear end of the slit 20S (the end portion at the main deploying portion 20M side) is formed in a substantially triangular shape whose width gradually widens vertically toward the rear end, such that bending, in the up-down direction as seen in side view, of the auxiliary deploying portion 20A and the auxiliary deploying portion 20B is permitted.

In the state in which the curtain airbag 20 is restrained by the restraining portion 34 as shown in this FIG. 3B (before being mounted to the vehicle body), the curtain airbag is folded into the form of a roll or folded into the form of bellows as described above, and is accommodated in the roof side portion 28.

Due to the above-described structure, at the front end portion of the curtain airbag 20, the auxiliary deploying portions 20A, 20B, that receive a supply of gas through the main deploying portion 20M, are expanded and deployed overlappingly in the vehicle width direction. In this state, the auxiliary deploying portion 20A at the upper side is expanded and deployed at the inner side, in the vehicle width direction, with respect to the auxiliary deploying portion 20B at the lower side. Accordingly, in this embodiment (illustrated example), the auxiliary deploying portion 20B corresponds to an outer side deploying portion, and the auxiliary deploying portion 20A corresponds to an inner side deploying portion. Note that there may be a structure in which the auxiliary deploying portion 20B at the lower side is expanded and deployed at the inner side, in the vehicle width direction, with respect to the auxiliary deploying portion 20A. In this case, the auxiliary deploying portion 20A corresponds to the outer side deploying portion, and the auxiliary deploying portion 20B corresponds to the inner side deploying portion.

The auxiliary deploying portion 20A, that serves as the inner side deploying portion in this embodiment, is expanded and deployed so as to cover the front pillar 26 and the vehicle width direction outer end portion of an instrument panel 36 as seen from the driver's seat occupant P. Further, as shown in FIG. 1 and FIG. 2, the auxiliary deploying portions 20A, 20B are expanded and deployed at the front side with respect to the airbag 18 for a frontal impact (the steering wheel 16), as seen in plan view and side view.

Further, the occupant protecting device 10 has an occupant protecting ECU 38 that serves as a control device. The occupant protecting ECU 38 is electrically connected to plural impact sensors that are not illustrated. On the basis of information from the respective impact sensors, this occupant protecting ECU 38 can sense (the occurrence of or that there inevitably will be) a frontal impact, a side impact, a rollover, a small overlap impact or an oblique impact with respect to the automobile A to which the occupant protecting ECU 38 is applied.

Here, a small overlap impact is an impact in which the amount of overlap in the vehicle width direction with the collided-with object, as prescribed by IIHS for example, is less than or equal to 25% of the overall width of the automobile A. For example, an impact with the vehicle width direction outer side of a front side member that is a part of the vehicle body skeleton, corresponds to a small overlap impact. In this embodiment, as an example, a small overlap impact at a relative speed of 64 km/hr is supposed. Further, an oblique impact is an impact from the oblique front of the vehicle as prescribed by NHSTA for example (as an example, an impact in which the relative angle with the collided-with object is 15° and the overlap amount in the vehicle width direction is around 35%). In this embodiment, as an example, an oblique impact of a relative speed of 90 km/hr is supposed.

In a case in which the occupant protecting ECU 38 senses a frontal impact, the occupant protecting ECU 38 causes the inflator of the driver's seat airbag device 12 to operate. Further, in a case in which the occupant protecting ECU 38 senses a side impact or a roll-over, the occupant protecting ECU 38 causes the inflator 22 of the curtain airbag device 14 to operate. Moreover, in a case in which the occupant protecting ECU 38 senses a small overlap impact or an oblique impact, the occupant protecting ECU 38 causes the inflator of the driver's seat airbag device 12 and the inflator 22 of the curtain airbag device 14, respectively, to operate.

(Operation)

Operation of the present embodiment is described next.

First, operation of the occupant protecting device 10 in a case in which the occupant protecting ECU 38 senses a small overlap impact is described.

When, on the basis of signals from the respective impact sensors, the occupant protecting ECU 38 senses that a small overlap impact has occurred, the occupant protecting ECU 38 causes the inflator of the driver's seat airbag device 12 and the inflator 22 of the curtain airbag device 14 to operate. Thus, the airbag 18 for a frontal impact receives a supply of gas from the inflator, and is expanded and deployed at the front of the driver's seat occupant P and at the upper rear side of the steering wheel 16.

Further, the curtain airbag 20 receives a supply of gas from the inflator 22, and the main deploying portion 20M is deployed in the shape of a curtain along the side window glasses 24. Moreover, the auxiliary deploying portions 20A, 20B, that receive a supply of the gas from the inflator 22 through this main deploying portion 20M, are expanded and deployed.

At the time of a small overlap impact, the driver's seat occupant P moves forward with respect to the vehicle body, and moreover, also moves outwardly in the vehicle width direction (refer to arrow L1 shown by the imaginary line in FIG. 1). Therefore, there are cases in which the head H of the driver's seat occupant P enters-in between the airbag 18 for a frontal impact and the main deploying portion 20M of the curtain airbag 20.

Here, at the present occupant protecting device 10, the auxiliary deploying portion 20A is expanded and deployed overlappingly at the vehicle width direction inner side of the auxiliary deploying portion 20B. At this time, the auxiliary deploying portion 20A is greatly protruded-out and deployed toward the vehicle width direction inner side, due to the auxiliary deploying portion 20B, that is expanded and deployed overlappingly at the vehicle width direction outer side of the auxiliary deploying portion 20A, being interposed between the auxiliary deploying portion 20A and the side window glass 24. Due thereto, the auxiliary deploying portion 20A is greatly moved (greatly protruded-out) inwardly in the vehicle width direction, as compared with a comparative example in which, for example, an end portion deploying portion is moved toward the vehicle width direction inner side by a tension cloth that is deployed due to tension being applied thereto between the main deploying portion 20M and the front pillar 26.

Due thereto, even if the head H of the driver's seat occupant P were to slip through between the airbag 18 for a frontal impact and the main deploying portion 20M, the head H contacting the front pillar 26 or the instrument panel 36 or the like would be prevented or effectively suppressed by the auxiliary deploying portion 20A. Further, due to the vehicle width direction outer end portion of the airbag 18 for a frontal impact, that limits forward movement of the head H, interfering with the auxiliary deploying portion 20A, the effect of effectively suppressing the head H slipping through between the airbag 18 for a frontal impact and the main deploying portion 20M also can be anticipated.

Next, operation of the occupant protecting device 10 in a case in which the occupant protecting ECU 38 senses an oblique impact is described.

When, on the basis of signals from the respective impact sensors, the occupant protecting ECU 38 senses that an oblique impact has occurred, the occupant protecting ECU 38 causes the inflator of the driver's seat airbag device 12 and the inflator 22 of the curtain airbag device 14 to operate. In an oblique impact, the driver's seat occupant P moves rectilinearly forward and toward the vehicle width direction outer side (refer to arrow L2 shown by the imaginary line in FIG. 1). Even in this case, the auxiliary deploying portion 20A is moved greatly toward the inner side in the vehicle width direction as described above, and therefore, the head H contacting the front pillar 26 or the instrument panel 36 or the like is prevented or effectively suppressed by the auxiliary deploying portion 20A. Moreover, due to the vehicle width direction outer end portion of the airbag 18 for a frontal impact, that limits forward movement of the head H, interfering with the auxiliary deploying portion 20A, the effect of effectively suppressing the head H slipping through between the airbag 18 for a frontal impact and the main deploying portion 20M also can be anticipated.

Further, at the curtain airbag device 14, the tethers 30, 32 are provided respectively at the pair of auxiliary deploying portions 20A, 20B, and, due to the front ends of the tethers 30, 32 being restrained by the restraining portion 34, the pair of auxiliary deploying portions 20A, 20B overlap one another. Namely, the structure, in which the auxiliary deploying portion 20A is expanded and deployed overlappingly at the vehicle width direction inner side of the auxiliary deploying portion 20B, can be obtained by a simple structure.

Note that the above-described embodiment illustrates an example in which the auxiliary deploying portions 20A, 20B are connected to the front pillar 26 via the tethers 30, 32, respectively, but the present invention is not limited to this. For example, there may be the structure that relates to the converted example shown in FIG. 4. The curtain airbag 20 shown in FIG. 4 has, instead of the tether 30, a tether 40 that serves as a connecting body that connects the auxiliary deploying portions 20A, 20B together.

Figure 4:
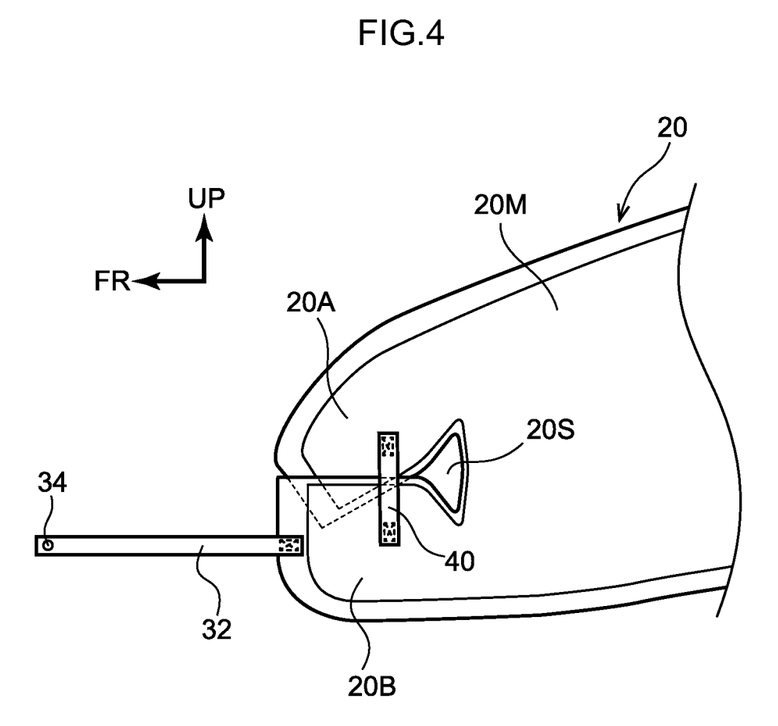
FIG. 4 is a side view corresponding to FIG. 3B and showing a converted example of the curtain airbag that structures the occupant protecting device relating to the embodiment of the present invention.

Due to the tether 40 directly connecting the auxiliary deploying portion 20A and the auxiliary deploying portion 20B, the state, in which the auxiliary deploying portion 20A and the auxiliary deploying portion 20B overlap one another in the thickness direction in the same way as the aspect shown in FIG. 3B, is maintained (the auxiliary deploying portion 20A and the auxiliary deploying portion 20B are restrained in this state). The curtain airbag 20 is, together with the tether

40, folded into the form of a roll or folded into the form of bellows, and accommodated in the roof side portion 28. In this converted example, the tether 32 is connected to the front end of the auxiliary deploying portion 20B at the lower side, and to (the restraining portion 34 to) the front pillar 26. Also in accordance with a structure that is provided with the curtain airbag 20 relating to this converted example, similar effects can be obtained by operation that is similar to that of the above-described embodiment.

Further, the above-described embodiment illustrates an example in which the curtain airbag device 14, together with the driver seat airbag device 12, structures the occupant protecting device 10, but the present invention is not limited to this. For example, the occupant protecting device may be structured by the curtain airbag device 14 and a safety device of a different form than the driver's seat airbag device 12. Or, for example, the occupant protecting device may be a structure that protects the occupant from a small overlap impact or an oblique impact by the curtain airbag device 14 alone. Moreover, for example, a pair of auxiliary deploying portions, that are expanded and deployed overlappingly in the vehicle width direction, may be provided at the front end of a main deploying portion for a rear seat, and the head of a rear seat occupant contacting the center pillar may be prevented or effectively suppressed.

Moreover, although the above-described embodiment illustrates an example in which the driver's seat airbag device 12 and the curtain airbag device 14 are operated in cases of small overlap impacts and oblique impacts, the present invention is not limited to this. For example, there may be a structure in which the driver's seat airbag device 12 and the curtain airbag device 14 are operated in the case of either one of a small overlap impact and an oblique impact. In this structure, the occupant is protected by another safety device in a case in which the other of a small overlap impact and an oblique impact occurs.

In addition, the present invention can, of course, be embodied by being converted in various ways within a scope that does not deviate from the gist thereof.

(Appendix)

A curtain airbag device relating to a first aspect includes: a main deploying portion that, at a time when a side impact arises, and at a time when at least one of a small overlap impact or an oblique impact arises, receives a supply of gas and expands, and is deployed in a shape of a curtain along a side window glass; an outer side deploying portion that is formed integrally with a front end side, in a vehicle front-rear direction, of the main deploying portion, and that receives a supply of gas from the main deploying portion and is expanded and deployed; and an inner side deploying portion that is formed integrally with the front end side, in the vehicle front-rear direction, of the main deploying portion, and that receives a supply of gas from the main deploying portion and expands, and is deployed overlappingly at a vehicle width direction inner side with respect to the outer side deploying portion.

In accordance with the above-described aspect, an occupant is protected from a side impact mainly by the main deploying portion. On the other hand, at the time of a small overlap impact or an oblique impact, there are cases in which the occupant, while moving toward the vehicle front, also moves toward the vehicle width direction outer side. Here, the inner side deploying portion is expanded and deployed at the front of the main deploying portion. Further, the outer side deploying portion is expanded and deployed overlappingly at the vehicle width direction outer side of the inner side deploying portion. Therefore, the outer side deploying portion is interposed between the inner side deploying portion and the side window glass. Due thereto, the inner side deploying portion is greatly protruded-out and deployed toward the vehicle width direction inner side. The occupant, who moves toward the vehicle front and the vehicle width direction outer side, can be protected directly or indirectly by this inner side deploying portion.

In this way, in the curtain airbag of the above-described aspect, the occupant protecting ability by the inner side deploying portion, that is expanded and deployed at the front of the main deploying portion, can be improved as compared with a structure that does not have the outer side deploying portion.

In the above aspect, a configuration may be provided, wherein the outer side deploying portion and the inner side deploying portion are folded-up in a state of being overlapped with one another by being connected to a front pillar via tethers, respectively.

In accordance with the above-described aspect, due to the outer side deploying portion and the inner side deploying portion being restrained by respective tethers so as to overlap one another, the inner side deploying portion is deployed overlappingly at the vehicle width direction inner side with respect to the outer side deploying portion.

In the above aspect, a configuration may be provided, wherein at least one of the outer side deploying portion or the inner side deploying portion is connected to a front pillar via a tether, and the outer side deploying portion and the inner side deploying portion are folded-up in a state of being overlapped with one another by being connected together by a connecting body.

In accordance with the above-described aspect, due to the outer side deploying portion and the inner side deploying portion being restrained by the connecting body so as to overlap one another, the inner side deploying portion is deployed overlappingly at the vehicle width direction inner side with respect to the outer side deploying portion.

In the above aspect, a configuration may be provided, wherein the outer side deploying portion and the inner side deploying portion are made into shapes of bags that are independent of one another, and are separated in a vehicle up-down direction with a slit that is formed along the vehicle front-rear direction therebetween, and a rear end of the slit is formed in a triangular shape whose width along the vehicle up-down direction gradually widens toward the rear end.

In accordance with the above-described aspect, due to the slit being formed in the above shape, bending of the outer side deploying portion and the inner side deploying portion is easily permitted. Therefore, the outer side deploying portion and the inner side deploying portion can be folded-up in a state of being overlapped with one another in the thickness direction.

An occupant protecting device relating to a second aspect includes: an airbag device for a front seat that, at a time when a frontal impact arises, and at a time when at least one of a small overlap impact or an oblique impact arises, causes an airbag for a frontal impact to expand and deploy by a supply of gas; and the curtain airbag device relating to any one of the above-described respective aspects, which is structured such that the outer side deploying portion and the inner side deploying portion are expanded and deployed at a front side, in the vehicle front-rear direction, with respect to the airbag for a frontal impact as seen in side view.

In accordance with the above-described aspect, an occupant, who moves also toward the vehicle width direction outer side while moving toward the vehicle front at the time of a small overlap impact or an oblique impact, is protected by at least one of the airbag for a frontal impact or the main deploying portion of the curtain airbag device. Here, the inner side deploying portion of the curtain airbag device is deployed at the front of the airbag for a frontal impact. Therefore, even if the occupant slips through between the airbag for a frontal impact and the main deploying portion, the occupant contacting a structure of the vehicle body (the instrument panel or a pillar or the like) can be prevented or effectively suppressed by the inner side deploying portion.

As described above, the curtain airbag device and occupant protecting device relating to the present invention have the excellent effect of being able to improve the occupant protecting ability by an inner side deploying portion that is expanded and deployed in front of a main deploying portion.

What is claimed is:

1. A curtain airbag device comprising:
a main deploying portion that, at a time when a side impact arises, and at a time when at least one of a small overlap impact or an oblique impact arises, receives a supply of gas and expands, and is deployed in a shape of a curtain along a side window glass;
an outer side deploying portion that is formed integrally with a front end side, in a vehicle front-rear direction, of the main deploying portion, and that receives a supply of gas from the main deploying portion and is expanded and deployed; and
an inner side deploying portion that is formed integrally with the front end side, in the vehicle front-rear direction, of the main deploying portion, and that receives a supply of gas from the main deploying portion and expands, and is deployed overlappingly at a vehicle width direction inner side with respect to the outer side deploying portion, the inner side deploying portion is adapted to cover a front pillar and a vehicle width direction outer end portion of an instrument panel, when deployed, as seen from a front seat occupant.

2. The curtain airbag device of claim 1, wherein the outer side deploying portion and the inner side deploying portion are folded-up in a state of being overlapped with one another by being connected to the front pillar via tethers, respectively.

3. The curtain airbag device of claim 1, wherein
at least one of the outer side deploying portion or the inner side deploying portion is connected to the front pillar via a tether, and
the outer side deploying portion and the inner side deploying portion are folded-up in a state of being overlapped with one another by being connected together by a connecting body.

4. The curtain airbag device of claim 1, wherein:
the outer side deploying portion and the inner side deploying portion are made into shapes of bags that are independent of one another, and are separated in a vehicle up-down direction with a slit that is formed along the vehicle front-rear direction therebetween, and
a rear end of the slit is formed in a triangular shape whose width along the vehicle up-down direction gradually widens toward the rear end.

5. The curtain airbag device of claim 2, wherein
the outer side deploying portion and the inner side deploying portion are made into shapes of bags that are independent of one another, and are separated vertically with a slit that is formed along the vehicle front-rear direction therebetween, and
a rear end of the slit is formed in a triangular shape whose width along a vehicle up-down direction gradually widens toward the rear end.

6. The curtain airbag device of claim 3, wherein
the outer side deploying portion and the inner side deploying portion are made into shapes of bags that are independent of one another, and are separated vertically with a slit that is formed along the vehicle front-rear direction therebetween, and
a rear end of the slit is formed in a triangular shape whose width along the vehicle up-down direction gradually widens toward the rear end.

7. An occupant protecting device comprising:
an airbag device for a front seat that, at a time when a frontal impact arises, and at a time when, among a small overlap impact and an oblique impact, an impact of a form in which a main deploying portion is deployed arises, causes an airbag for a frontal impact to expand and deploy by a supply of gas; and
the curtain airbag device of claim 1, which is structured such that the outer side deploying portion and the inner side deploying portion are expanded and deployed at a front side, in the vehicle front-rear direction, with respect to the airbag for a frontal impact, as seen in side view.

8. An occupant protecting device comprising:
an airbag device for a front seat that, at a time when a frontal impact arises, and at a time when, among a small overlap impact and an oblique impact, an impact of a form in which a main deploying portion is deployed arises, causes an airbag for a frontal impact to expand and deploy by a supply of gas; and
the curtain airbag device of claim 2, which is structured such that the outer side deploying portion and the inner side deploying portion are expanded and deployed at a front side, in the vehicle front-rear direction, with respect to the airbag for a frontal impact, as seen in side view.

9. An occupant protecting device comprising:
an airbag device for a front seat that, at a time when a frontal impact arises, and at a time when, among a small overlap impact and an oblique impact, an impact of a form in which a main deploying portion is deployed arises, causes an airbag for a frontal impact to expand and deploy by a supply of gas; and
the curtain airbag device of claim 3, which is structured such that the outer side deploying portion and the inner side deploying portion are expanded and deployed at a front side, in the vehicle front-rear direction, with respect to the airbag for a frontal impact, as seen in side view.

10. An occupant protecting device comprising:
an airbag device for a front seat that, at a time when a frontal impact arises, and at a time when, among a small overlap impact and an oblique impact, an impact of a form in which a main deploying portion is deployed arises, causes an airbag for a frontal impact to expand and deploy by a supply of gas; and
the curtain airbag device of claim 4, which is structured such that the outer side deploying portion and the inner side deploying portion are expanded and deployed at a front side, in the vehicle front-rear direction, with respect to the airbag for a frontal impact, as seen in side view.

11. An occupant protecting device comprising:
an airbag device for a front seat that, at a time when a frontal impact arises, and at a time when, among a small overlap impact and an oblique impact, an impact of a form in which a main deploying portion is deployed arises, causes an airbag for a frontal impact to expand and deploy by a supply of gas; and the curtain airbag device of claim 5, which is structured such that the outer side deploying portion and the inner side deploying portion are expanded and deployed at a front side, in the vehicle front-rear direction, with respect to the airbag for a frontal impact, as seen in side view.

12. An occupant protecting device comprising:

an airbag device for a front seat that, at a time when a frontal impact arises, and at a time when, among a small overlap impact and an oblique impact, an impact of a form in which a main deploying portion is deployed arises, causes an airbag for a frontal impact to expand and deploy by a supply of gas; and the curtain airbag device of claim 6, which is structured such that the outer side deploying portion and the inner side deploying portion are expanded and deployed at a front side, in the vehicle front-rear direction, with respect to the airbag for a frontal impact, as seen in side view.

13. The curtain airbag device of claim 2, wherein:

the outer side deploying portion and the inner side deploying portion are configured as bags that are independent of one another, and are separated in a vehicle up-down direction with a slit that is formed along the vehicle front-rear direction therebetween;

the rear end of one of the tethers is connected to a front end of the inner side deploying portion, and the rear end of another tether is connected to a front end of the outer side deploying portion; and the inner side deploying portion and the outer side deploying portion are set in a state of overlapping one another in the vehicle width direction due to front ends of the tethers being restrained together at a restraining portion.

14. The curtain airbag device of claim 3, wherein:

the outer side deploying portion and the inner side deploying portion are configured as bags that are independent of one another, and are separated in a vehicle up-down direction with a slit that is formed along the vehicle front-rear direction therebetween; and the tether is connected to the one of the inner side deploying portion or the outer side deploying portion that is positioned at a lower side, and to the front pillar.

15. The curtain airbag device of claim 1, wherein:

the outer side deploying portion and the inner side deploying portion are configured as bags that are independent of one another, and are separated in a vehicle up-down direction with a slit that is formed along the vehicle front-rear direction therebetween, and the inner side deploying portion is positioned at a lower side or upper side with respect to the outer side deploying portion in the vehicle up-down direction.

16. An occupant protecting device, comprising:

an airbag device for a front seat that, at a time when a frontal impact arises, and at a time when, among a small overlap impact and an oblique impact, an impact arises at which a main deploying portion is deployed, causes an airbag for a frontal impact to expand and deploy by a supply of gas; and the curtain airbag device of claim 13, which is structured such that the outer side deploying portion and the inner side deploying portion are expanded and deployed at a front side, in the vehicle front-rear direction, with respect to the airbag for a frontal impact, as seen in side view.

17. An occupant protecting device, comprising:

an airbag device for a front seat that, at a time when a frontal impact arises, and at a time when, among a small overlap impact and an oblique impact, an impact arises at which a main deploying portion is deployed, causes an airbag for a frontal impact to expand and deploy by a supply of gas; and the curtain airbag device of claim 14, which is structured such that the outer side deploying portion and the inner side deploying portion are expanded and deployed at a front side, in the vehicle front-rear direction, with respect to the airbag for a frontal impact, as seen in side view.

18. An occupant protecting device, comprising:

an airbag device for a front seat that, at a time when a frontal impact arises, and at a time when, among a small overlap impact and an oblique impact, an impact arises at which a main deploying portion is deployed, causes an airbag for a frontal impact to expand and deploy by a supply of gas; and the curtain airbag device of claim 15, which is structured such that the outer side deploying portion and the inner side deploying portion are expanded and deployed at a front side, in the vehicle front-rear direction, with respect to the airbag for a frontal impact, as seen in side view.

19. The curtain airbag device of claim 1 further comprising a gas supplying device which, when actuated at the time when the side impact arises and at the time when at least one of the small overlap impact or the oblique impact arises, supplies gas to the main deploying portion.

20. An occupant protecting device, comprising:

an airbag device for a front seat that, at a time when a frontal impact arises, and at a time when, among a small overlap impact and an oblique impact, an impact arises at which a main deployment portion is deployed, causes an airbag for a frontal impact to expand and deploy by a supply of gas; and the curtain airbag device of claim 19, which is structured such that the outer side deploying portion and the inner side deploying portion are expanded and deployed at a front side, in the vehicle front-rear direction, with respect to the airbag for a frontal impact, as seen in side view.

* * * * *